United States Patent [19]

Wilson et al.

[11] Patent Number: 4,522,054

[45] Date of Patent: Jun. 11, 1985

[54] EMERGENCY RESCUE APPARATUS

[75] Inventors: Randall J. Wilson; Bruce C. Wilson, both of Don Mills, Canada

[73] Assignee: Power Pry Corporation, Don Mills, Canada

[21] Appl. No.: 535,806

[22] Filed: Sep. 26, 1983

[51] Int. Cl.³ .............................................. B21D 1/12
[52] U.S. Cl. .................................... 72/392; 72/453.16; 72/464; 72/705
[58] Field of Search ................. 72/407, 453.15, 453.16, 72/464, 705, 392; 30/124, 134, 180, 228; 254/93 H

[56] References Cited

U.S. PATENT DOCUMENTS

| 776,110 | 11/1904 | Carney et al. | 72/407 |
| 2,352,390 | 6/1944 | Kirkland | 254/93 H |
| 2,497,836 | 2/1950 | Miller | 72/392 |
| 2,588,509 | 3/1952 | Forster | 72/392 |
| 4,392,263 | 7/1983 | Amoroso | 72/464 |

Primary Examiner—Lowell A. Larson

[57] ABSTRACT

A rescue device for achieving emergency access to automobiles or buildings or the like has a pair of pivotally connected lever arms is designed to be hydraulically operated by a tool connected between the two arms to power them to open prying jaws at the free ends of the lever arms. Manual actuation for the hydraulic operation is part of the device.

13 Claims, 8 Drawing Figures

EMERGENCY RESCUE APPARATUS

This invention relates to rescue apparatus comprising a pair of pivotally connected operating tools hydraulically operated to provide a spreading or shearing action to thereby allow forcible access to a car, building or enclosure or barrier.

The closed prior art known to applicant is:
(1) Applicant's prior application Ser. No. 276,938 filed June 24, 1981 (now abandoned).
(2) Prior art located in applicant's search, as follows:
   U.S. Pat. No. 3,819,153, Hurst
   U.S. Pat. No. 3,891,187, Bearden
   U.S. Pat. No. 4,273,311, Rio
   U.S. Pat. No. 4,279,141, Galuart
   U.S. Pat. No. 4,333,330, Porter
   U.S. Pat. No. 3,762,688, Leonhardt
   U.S. Pat. No. 3,219,316, Fried
   U.S. Pat. No. 3,694,918, Bailey
   U.S. Pat. No. 3,710,407, Reid
(3) Candian Pat. No. 1,089,636 of Ronald E. Keigley, dated Nov. 18, 1980.
(4) Patents listed in the Keigley patent, namely:
   U.S. Pat. No. 343,780, June 15, 1886
   U.S. Pat. No. 2,096,574, Oct. 19, 1937
   U.S. Pat. No. 2,979,032, Apr. 11, 1961
   U.S. Pat. No. 3,058,214, Oct. 16, 1962
(5) Patents cited against application Ser. No. 276,938 filed June 24, 1981.
   U.S. Pat. No. 2,028,905, Hein
   U.S. Pat. No. 2,296,173, Mandl
   U.S. Pat. No. 2,588,509, Forster
   U.S. Pat. No. 2,657,904, Evenson
   U.S. Pat. No. 3,081,066, Murawski
   U.S. Pat. No. 3,292,903, Meyer et al.

It is an object of applicant's invention to provide an access or rescue tool having hydraulically actuated pivotally connected arms at least one of which arms and usually both carries an operating tool, which is more efficient and suitable for access and rescue operations than the tools of the prior art.

It is an object of applicant's invention to provide an access or rescue tool having hydraulically actuated, pivotally connected arms at least one of which arms and usually both carry operating tools wherein the arms are pivotally connected adjacent one end of each arm, the tools are attached adjacent the free end of one or each arm and a hydraulic cylinder and its associated piston rod are pivotally connected to said respective arms, intermediate said ends for control of the relative pivotal movement of said arms in the working direction. There is thus provided a rescue or access tool which is more compact and convenient in operation than previous tools.

By the term "working direction" reference is made to the fact that in applicant's preferred mode of operation the hydraulic cylinder is used to operate the arms in only one direction to perform the work, while movement of the arms in the opposite direction is a non-working, return operation.

It is an object of the invention to provide a tool as defined in the second preceeding paragraph wherein the cylinder is mounted to project from the arm to which it is attached in a direction approximately transverse to the median axis between the arms and a manually operated hydraulic pump is located on the end of the cylinder remote from the arm for easy manual operation.

It will be noted that provision of the hydraulic pumps mounted on the hydraulic cylinder provides for a self-contained access or rescue tool. Most prior tools of this type require a hydraulic or pneumatic, pump or supply, separate from the tool. Such separate pump or supply greatly increases the size of the equipment, decreases its usefulness in confined quarters and greatly increases its cost of use.

It is an object of applicant's invention to provide an access or rescue tool having hydraulically actuated pivotally connected arms, at least one of which arms and usually both carry operating tools, wherein the arms are pivotally connected adjacent one end of each arm, the tools are adjacent the free end of one or each arm; and wherein a hydraulic cylinder is pivotally connected to one of the arms while the piston rod projecting from the cylinder is pivotally connected to the other of said arms. By arranging that the last two pivotal connections are approximately equidistant from the pivotal connection of the arms, it is provided that the cylinder and rod, actuating the arms, are acting approximately transverse to the median line between the two arms, for best efficiency. It should be noted that one of the design features rendering such arrangement convenient is the fact that the hydraulic pump for actuating the cylinder is mounted thereon, whereby the unit is self-contained and the requirement for connecting lines to the tool is avoided.

It is an object of the invention to provide an access or rescue tool as described in the previous paragraph wherein each of the arms comprise two members spaced in the direction parallel to the pivot axis connecting the arms. The spaced members are joined by connecting or bridging members into a rigid frame. The cylinder is pivotally mounted on one arm, and the piston rod on the other, in a location such that the axis of cylinder and rod, acts between the spaced frame members of each arm. The result is an extremely strong tool for the high stresses to be applied and the strength stems from both the rigid frame and its connection to cylinder and rod.

Other objects and advantages of the invention will be apparent from the description of the specific embodiment to follow.

In drawings which illustrate a preferred embodiment of the invention:

FIG. 3 is a view of the tool pivot along the line 3—3 of FIG. 1;

Figure 1:
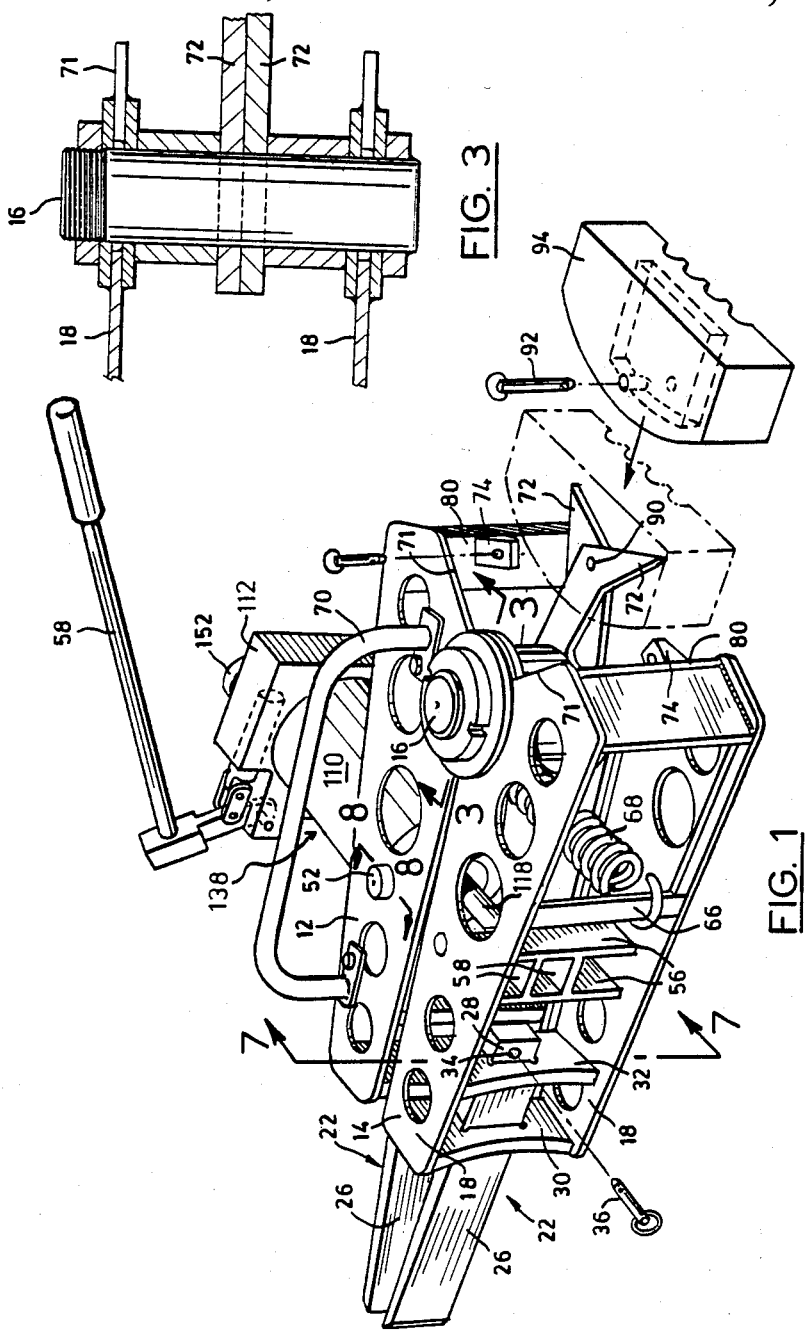
FIG. 1 shows a perspective view of an access or rescue tool in accord with the invention; with the auxiliary shears inoperable.

In the drawings a pair of arms 12 and 14 are pivotally connected to each other adjacent one end of the arms by pivot shaft 16.

Each arm comprises a pair of members 18 preferably of plate-like construction, spaced in the axial direction of shaft 16 and joined by connecting or bridging spans 30, 32, 56 and 80. On the other end of each arm from the pivotal junction or free end is provided means for mounting a working tool. In the example shown, the working tools are a pair of probes 22 designed, to exert on outwardly prying force, upon opening movement of arms 12, 14. Such probes are mounted by slotting the two outer spans 30 and 32 of each arm.

The probes 22 are provided with an outer extent of wide rectilinear cross-section 26 and an inner tongue extent of narrower rectilinear cross-section 28. The transition from the outer to the inner extent provides inwardly bearing shoulders 31. Outer span 30 of each arm is apertured to receive the wider extent 26 of the probe in a close, sliding fit. The next inner span 32 is apertured to receive the narrower probe section 28 in a close sliding fit. The tongue portion 28 is provided with an aperture 34 located to receive a pin 36 bearing on the inner side of span 32 when shoulder 31 is bearing on the outer side of the span. Shoulder 31 and pin 36 therefore retain such probe 22 in position on its arm 14.

Spans 30, 32 and the other spans bridging plates 18 on the inner extent of the arm maintain plates 18 in spaced relationship. The spacing is selected to accomodate the piston rod 118 and the rod-projection end of the hydraulic cylinder 110 therebetween.

Figure 4:
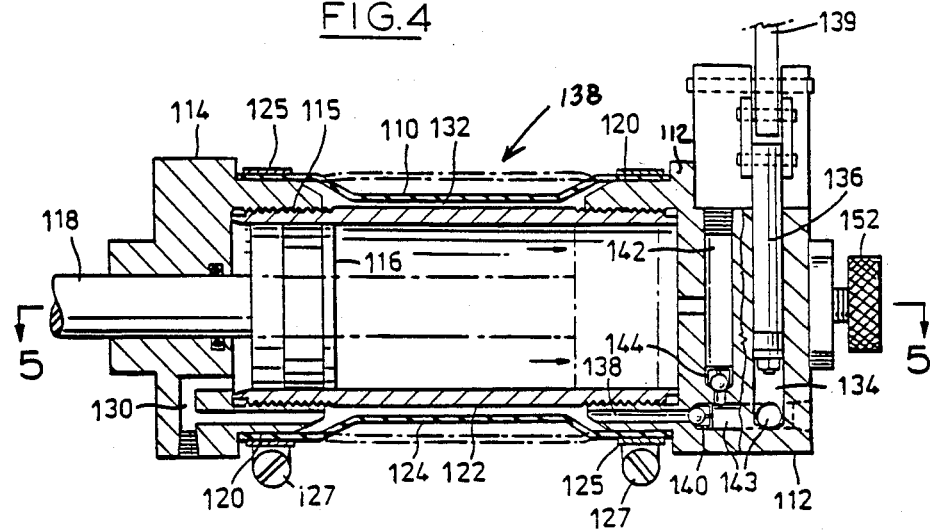
FIG. 4 is a section of the preferred hydraulic cylinder for use with the invention along the lines 4—4 of FIG. 5.

The preferred form of the piston cylinder, having a flexible walled, variable volume hydraulic reservoir, is that described in co-pending application Ser. No. 567,623 filed Jan. 19, 1983, and assigned to a common assignee. The advantages are fully described in that application. A specific description of the cylinder 110 is included herein with reference to FIGS. 4-6.

In the drawings a piston cylinder comprises a cylindrical wall 110. A pair of end blocks 112 and 114 are attached to each end of the wall 110 to form therewith a piston chamber. End blocks 112 and 114 are attached to cylindrical wall 110 in any desired hydraulically sealed arrangement, and, in the embodiment shown are screwed onto threads 115 on the outside of each end of wall 110. A piston 116 is designed to reciprocate in the cylindrical wall and is in substantial sliding sealing contact with the inner surface of 110. Piston 116 is provided with suitable packing and sealing arrangements not shown in detail. Attached to one side of piston 16 is piston rod 18 extending longitudinally out of the chamber through the bore in end block 114 with which it is in substantial hydraulic sliding sealing arrangement. (In applications of using such hydraulic piston which are now shown here in detail the force exerted by the piston is utilized by coupling the cylinder to one of the members on which the force is to be exerted and coupling the projecting end of the piston rod to the other of the members on which force is to be exerted).

Each end block is shaped to provide a cylindrical outer surface 120 at the block end facing the other block and the cylindrical outer surface is located radially outwardly from the outside surface 122 of the cylinder wall. Flexible material 124 forms a cylindrical sleeve compatible with the hydraulic fluid used and is hydraulically sealed to both surfaces 120, such as by clamps 125. The flexible material 124 extends between the surfaces 120 and forms with end blocks 112 and 114 and the outer surface 128 of the piston cylinder wall, the variable volume storage chamber 132 of the invention for continuing hydraulic fluid used in the hydraulic circuit. By contrast between the dotted and solid line positions of FIG. 4, it will be seen that the storage chamber preferably varies between a large volume (dotted position) where the wall 124 extends substantially straight between surfaces 120, and a smaller volume (solid line position) where the wall is moved inwardly toward surface 122. It is within the scope of the invention, using suitable material for wall 124 to have the wall 124 bulge outwardly in its large volume state. In fact, as noted hereafter the attitude of flexible wall 124 is determined by the amount of hydraulic fluid added during filling.

It will be noted that the preferred shape of abutment peripheries 120 is cylindrical. However it will be noted that the sealing surface for attaching wall 124 thereto may be any shape which allows hydraulic sealing with the wall. In fact, in the broader aspects of the invention the wall 124 may be sealed to the cylinder in any desired manner which allows the wall in combination with the outer surface of the cylinder and end members to form a variable hydraulic fluid storage chamber.

The wall 124 must be flexible and is preferably resilient. I prefer to use that known by the trade mark Nitrile, a synthetic rubber manufactured by Snowden Rubber Products Limited of Oshawa, Ontario, Canada. It would be satisfactory to use plastic or natural rubber. However, in the case of natural rubber there is a tendency for it to be eroded by some hydraulic fluids.

Figure 6:
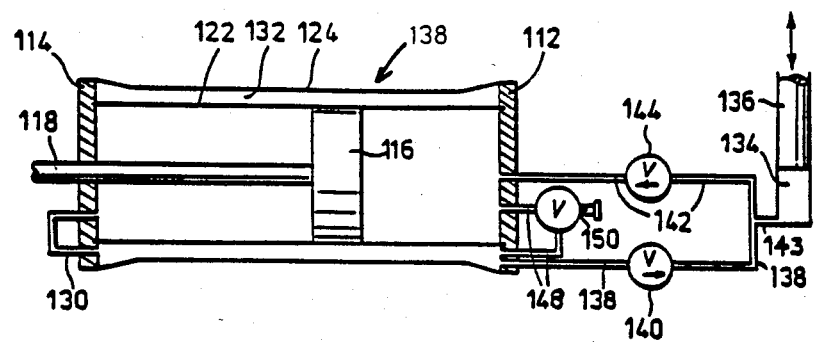
FIG. 6 is a schematic indication of the hydraulic cylinder hydraulic circuit.
Figure 7:
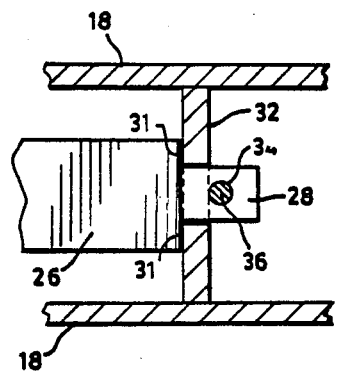
FIG. 7 is a partial section taken along the lines 7—7 of FIG. 1.

In the description of the physical arrangement of the hydraulic circuit of the invention, reference may be had to FIG. 6 which shows, schematically, the hydraulic components.

The drawings show passage 130 bored in the material of block 14 to connect that portion of the piston chamber, which is on the piston rod 118 side of piston 116, to the variable volume storage chamber 132. Such hydraulic connection 130, without valving, will be on the side of the piston which is the low pressure side during the application of hydraulic force to the piston by the pump to be described.

In the block 112 a longitudinally extending pumping chamber 134 is provided in which a plunger 136 reciprocates under the control of pumping handle 38 as shown, to cyclically vary the volume in the pumping chamber 34. Block 112 is bored to provide a hydraulic connection from the storage chamber 132 to the pumping chamber 134, and the connection being embodied by bore 138. A one way valve 140 in bore 138 designed and arranged to allow flow only in the direction from the storage chamber 132 to the pumping chamber 134. A bore 142 is also provided in the block 112 connecting the pumping chamber 34 with that portion of the piston cylinder which is on the side of piston 116 adjacent the block 112. The bore 142 is provided with a one way valve 144 designed and arranged to allow flow only in the direction of the piston chamber. A third bore 146 in block 112 provides a hydraulic connection from that portion of the piston chamber which is on the side of piston 116 which is adjacent the block 112. If the third bore 148 coincides in part with bore 142, the coincident portion of bore 142 must be on the downstream (piston chamber) side of one way valve 144. The third bore 148 is a bypass line for allowing return of the piston and piston rod from their extended to their retracted position. At other times third bore 148 in its unique extent between any coincident extent with bore 142 and the piston chamber is closed by a shut-off valve. The shutoff valve is embodied by screw valve 150 operated by knob 152 to close bore 148 at seat 152.

Means, not shown, are provided for filling with hydraulic fluid, the hydraulic circuit including principally the piston, pumping and storage chambers and the bores described. The amount of fluid used will take into account the desired attitudes of the storage chamber wall in both the retracted and extended position of the piston and will be selected to provide that, in all positions of the piston rod the outward pressure of hydraulic fluid on wall 124 will be opposed by the inward pressure of the exterior atmospheric pressure. With such arrangement the piston chamber may be used in any orientation and size of the storage chamber will conform to the fluid stored to avoid a lack of oil for the pump, "pump starvation" and resultant partial vaccum causing pump failure and tending to result in the inward leakage of air. (The presence of air in the system causes air lock).

For operation the piston cylinder will be connected to one arm 12 of the tool and the piston rod to the other arm 14 as hereinafter described.

Figure 5:
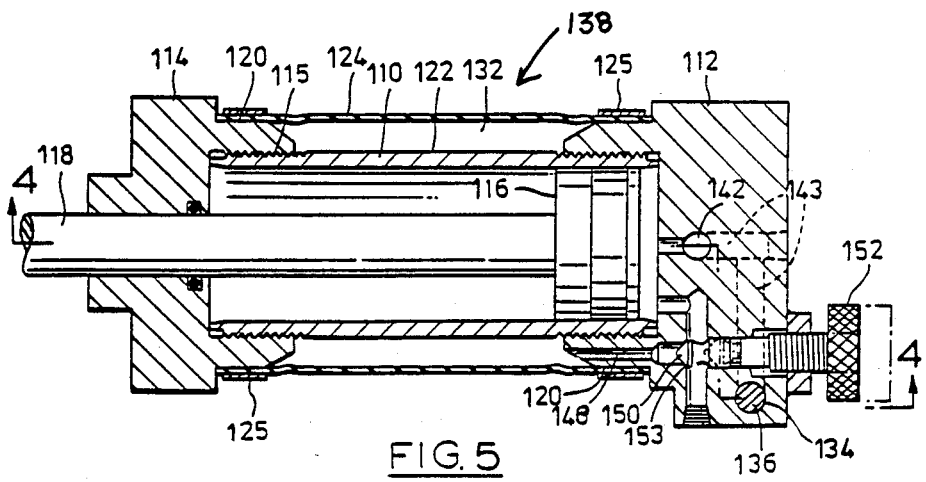
FIG. 5 is a section of such cylinder along the lines 5—5 of FIG. 4.

In operation, with the piston rod 118 retracted and shut-off valve 150 closed, the maximum volume of the piston rod will be in the piston chamber and the storage chamber 132 will have its wall 124 distended to assume its maximum volume (as shown in FIG. 5). To extend the piston rod, the pump plunger 136 is operated by strokes of handle 138. On each retraction of the plunger 136 increasing the volume of the pumping chamber 142, hydraulic fluid is withdrawn from storage chamber 132 through one way valve 138. On each extension of the plunger 134, decreasing the volume in the storage chamber, the hydraulic fluid is forced by the plunger into the adjacent side of the piston chamber through valve 144 with valve 138 then blocking the fluid path from the pump to the storage chamber. Fluid pumped past valve 144 to the adjacent portion of the piston chamber moves the piston 116 in the extension direction for the piston rod 118. The piston 116 moves fluid from that portion of the piston chamber containing rod 118 into the storage chamber 132. As the piston moves in this way with repeated cycles of the plunger to extended postion for the piston rod 118 the storage chamber 132, changes in volume due to the fact that more hydraulic fluid is required in the piston chamber as a whole to compensate for the fact that the volume of piston rod contained in the piston chamber is decreasing. The storage chamber 132 thus contracts drawing wall 124 toward surface 128 during such rod extending movement. When it is desired to retract the piston rod 118, shutoff valve 150 is opened, opening the bypass line 148 about piston through the storage chamber 132 between the two portions of the piston chamber. With shut off valve 150 open, the piston is returned to its retracted position by spring 68 described hereafter. As the piston is retracted the piston rod volume in the piston chamber as a whole increases causing a consequent increase in the volume of the storage chamber 132. Thus during such retracting movement of the piston rod the storage chamber distends so that wall 124 reaches the dotted position of FIG. 4. After the required retraction of piston rod 118 by-pass valve 150 is again closed to prepare the hydraulic circuit for a further pumping (piston rod extending) phase.

The above is a description of the piston cylinder and piston which with their inventive features and advantages are fully described in co-pending application Ser. No. 567,623 filed Jan. 19, 1983 and assigned to a common assignee. The piston cylinder 138 described is of specific advantage with the rescue or access tool of the present invention in that the presence of the variable volume wall reservoir 132 there provided contributes to the facility of obtaining full and efficient delivery of hydraulic force from the hydraulic cylinder in any attitude or inversion of the rescue tool. However, although not preferred, any hydraulic cylinder and pump for controlling extension of the piston rod (with a by-pass for piston rod return) may be used with the rescue tool and is within the scope of the invention as defined in the broader claims hereof. Such alternative cylinder and piston will obviously be preferably of a type which allows use of the tool in any attitude or inversion without impairment of the efficiency of the cylinder.

The piston cylinder and rod of the preferred or of an alternative type, is mounted on the arms 18. Abutment 50 on the end block 114 of the piston cylinder (at the opposite end thereof from the pump) is recessed above and below to receive the ends of pivot pins 52 and 54 which are anchored in the respective upper and lower members 18 of arm 12. Thus the cylinder 138 is pivotally mounted on arm 12 on an axis parallel to the pivot axis connecting arms 12 and 14; with the piston cylinder 110 and end cap 112 projecting away from both arms 12 and 14. Detachable operating handle 58 for the pump plunger is of course located on end cap 112. Thus it will be noted that plates 18 and forming this arm 12 are spaced to receive between them the diameter of cylinder 138 at abutment 50 projecting therebetween and pivotally connected thereto.

On the other arm 14 mounting pins 52 and 54 are provided a pair of bridging spans 56. Between the bridging spans 56 are a pair of plates 58 with aligned apertures. The end 62 of piston rod 118 is shaped to be received between plates 58 and apertured to receive pin 64 which extends through both plates 58 and end 62 to pivotally connect the rod and the other arm 14. This pivotal connection, like that for the piston cylinder to arm 12 is substantially parallel to the pivotal axis of pin 16 connecting arms 12 and 14. It will be noted that the pivotal connections for the piston cylinder 138 and the rod 118 to the respective arms 12 and 14 are located so as to dispose the axis of the hydraulic cylinder and rod, in various stages of extension approximately transverse to the median line between arms 12 and 14 and roughly intermediate the pivot connection and the free ends of the arms. The transverse orientation achieves a very efficient use of the force of the piston. Further it will be noted that piston force is efficiently received and transmitted to the tools because of the strong and efficient arrangement of the twinned members forming for each such arm 12 or 14 a rigid framework and spaced to receive piston cylinder and rod therebetween extending approximately transversely to the arms median line.

Posts 66 extending between each pair of arm members 18 making up arm 12, and with a similar construction on arm 14 adjacent cylinder and rod respectively but just inwardly thereof form anchors for a tension spring 68 extending therebetween and acting to bias the arms toward closed position and the piston rod to retracted position.

Handle 70 for holding the device during use is attached to the same arm 12 as the cylinder 138.

Although there is an optional additional feature to be described it is desired to describe the operation of the device up to this point. With the arms 12 and 14 in closed position, and the piston bypass valve controlled by knob 152 closed, the probes 22 are inserted in an aperture to be opened under emergency conditions, such as between the door and door post of a damaged automobile. The tool may be operated, grasping the handle 70 with the left hand while operating the pump handle 58 back and forth with the right. Under such pump operation the arms and probes separate under the hydraulic forces provided by the piston and perform the operation designed of opening a door or the aperture on a damaged panel or the like. When it is desired to close the arms, the bypass valve is opened by rotation of knob 152 and the arms 12 and 14 probes 22 and piston rod are contracted under the bias of spring 68.

It will be obvious that the probes shown may be replaced with other tools having any desired working surfaces but having their inner surfaces shaped to be attached to the spans 30 and 32 of the arms 12 and 14 in the same manner as were probes 22. In place of the probes there may be provided other attachments. For example shears may be provided by blades crossed in their extensions from the respective arms to provide a shearing action on the opening motion of the arms.

Figure 2:
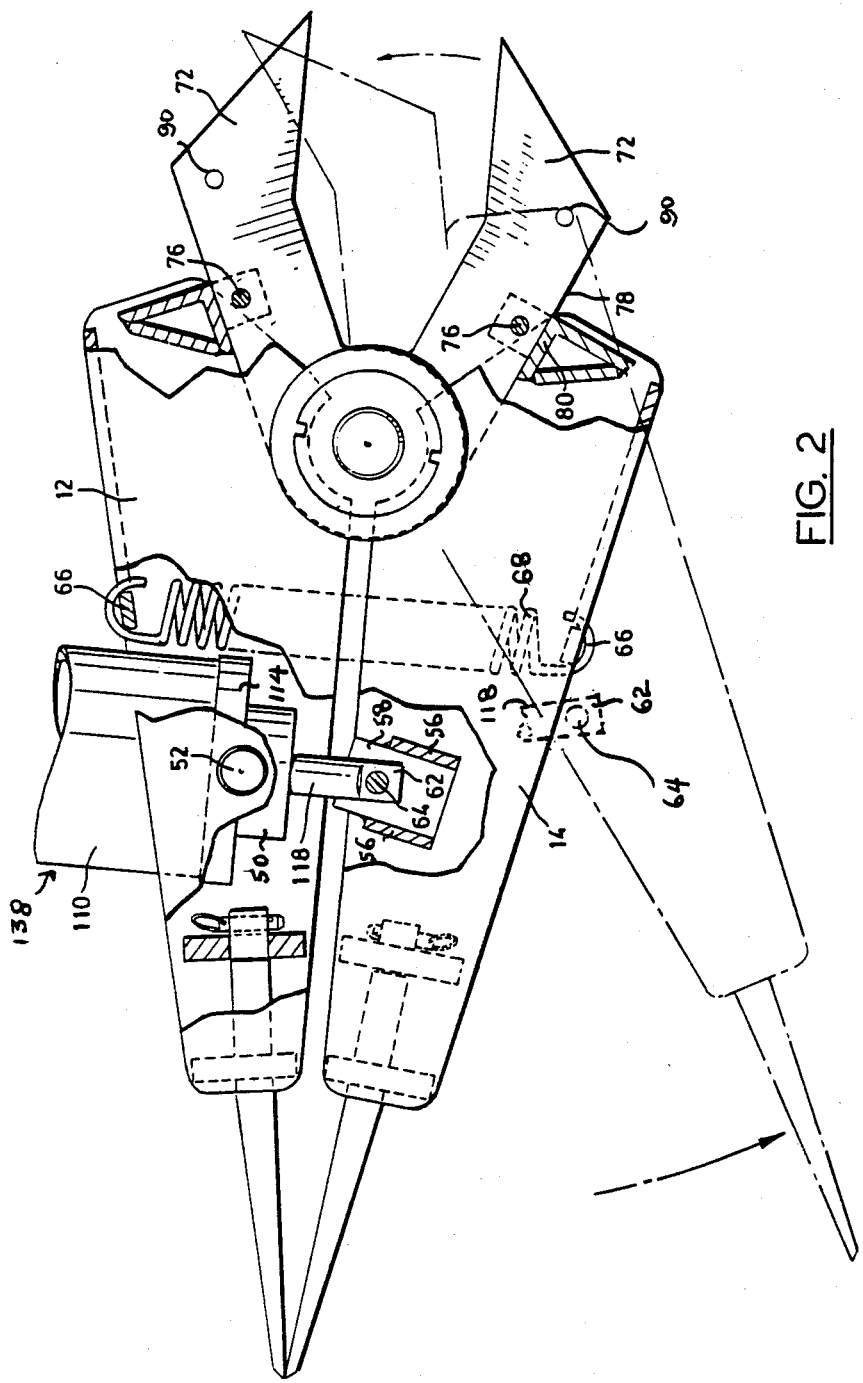
FIG. 2 is a plan view of such tool with the auxiliary shears operable.

It is now desired to describe an optional feature available. As FIGS. 1, 2 and 3 show, a pair of blades members 72 may be pivotally mounted on pin 16 to project therefrom in the opposite direction to arms 12 and 14. The blade members 72 in use are coupled to the diverging surfaces 71 of arms 12, 14 near the pivot point. Each arm in its short extension from pin 16 (in the opposite direction to its free ends) is provided with a support for a blade 72. Thus the arm 14 in FIG. 1, which, in use, supports the lower blade 72 has a triangular abutment 74 designed to provide a support surface immediately below lower blade 72 in its opened position. The abutment is provided with a vertical bore to allow lower blade 72 to be coupled to abutment 74 and hence to arm 14 for movement therewith. Arm 12 which, in use, supports the upper blade 72 has a triangular abutment 74 designed to provide a support surface immediately above upper blade 72 in its opened position. The abutment is provided with a vertical bore to allow upper blade 72 to be coupled to this abutment 74 and hence to arm 12 for movement therewith. It should be noted that when coupled to an arm 12 or 14 by pin 76 the rear edge 78 of each blade is bearing on the edge of bridging member 80 of the corresponding arm 12 or 14. This is important since the shearing force applied, by an arm 12 or 14 to a blade 72 as the blades close is applied from the bridging member 80 to the blade edge 78 rather than through coupling pins 76. The coupling pins thus preferably act only to open the blades 72 as the arms 12, 14 close, in the retraction direction. The blades 72 are designed to slide over each other as with shear to the arrangement as shown dotted in FIG. 2.

In operation, to perform a shearing action with the blades, the arms 12, 14 are in closed position (as in the solid line position of FIG. 2), the blades 72 therefore being open as in FIG. 2 (solid) and the bypass valve closed by rotation of valve 152. The tool is reversed relative to the operation using the probes, and the shears 72 are applied to an object to be cut, such as a damaged auto door post. The pump handle 58 is again operated manually. As the pump 72 is operated arms 12, 14 open as before. The shears 72 close and perform their shearing function. When the shearing operation is completed the bypass valve is opened and the arms through spring 66 moved to closed (and the shears to open) position.

The triangular abutments 74 support the blades 72 in during the shearing operation at which time shearing pressures tend to bias the blades 72 apart. Thus the abutment 74 on arm 14 supports its associated blade 72 against downward pressures and the abutment 74 on arm 12 supports its associated blade 72 against upward pressures.

When it is desired to use the probes 22 or substitutes at the free ends of arms 12, 14 the pins 76 coupling blades 72 to arms 12, 14 are withdrawn so that the shears may be collapsed (pivotting about pin 16) into overlapped position as shown in FIG. 1. When so overlapped, then aligned apertures 90 in blades 72 receive a pin 92 which couples to The shears, the blade guard/handle of aluminum or plastic 94 protects the operator of the device from the blades.

Figure 8:
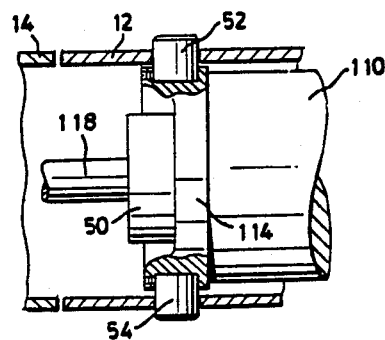
FIG. 8 is a partial section along the lines 8—8 of FIG. 1.

The various pins shown in this application may be retained in place by any desired means well known to those skilled in the art. However, preferred means are as follows. Pins 36, 76 and 92 are each, preferably of the type known as detent ball lock pins manufactured by Avdel Inc. of 2696 Slough St., Mississauga, Ontario. Pins 52 are preferably retained by set screws as schematically indicated in FIG. 8. Pins 64 are retained in place by locking rings not shown.

We claim:
1. Access or rescue tool comprising:
a pair of arms pivotally connected together adjacent one end of each of such arms,
whereby the opposed ends are free,
each arm comprising a pair of members spaced in the direction of the connection pivotal axis,
each such pair of members being joined by a plurality of bridging members to form a rigid framework,
a hydraulic piston cylinder having a piston contained therein, a piston rod attached to said piston and projecting from one end of said cylinder,
said piston cylinder being pivotally connected to one of said arms intermediate its connected and its free end,
said piston rod being pivotally connected to the other of said arms intermediate its connection and its free end,
said cylinder and piston rod pivotal connection being substantially parallel to the arm pivotal connection,
said piston cylinder and said piston rod being pivotally attached to said arms so that the piston rod and the axis of said cylinder extend between the spaced members forming each of said arms,
means for mounting a tool on the free end of at least one of said arms,
means for providing hydraulic fluid to said cylinder to move said piston rod in one direction relative to said cylinder,
and means operable to allow movement of said piston rod relative to said cylinder in the opposite direction,
wherein a hydraulic pump for moving said piston rod in said one direction is arranged to form a rigid unit with said cylinder, said hydraulic pump having manual operating means.

2. Access or rescue tool as claimed in claim 1 wherein said cylinder pivot connection and said rod pivot connection are approximately equally spaced from the pivot axis where said arms are pivotally connected.

3. Access or rescue tool as claimed in claim 2 wherein said cylinder includes a hydraulic fluid reservoir connected to the low pressure side of the hydraulic circuit for operating said cylinder located on the outside of said cylinder wall, said reservoir being partially defined by a flexible wall on the outside of said cylinderical wall, said flexible wall being subject to outward pressures by the hydraulic fluid and inward atmospheric pressure.

4. Access or rescue tool as claimed in claim 2 including a pair of shears, each connected to pivot on said arm pivot axis, each said shear being mounted to project from said pivot point in the opposite direction from said free arm ends, said two shears being arranged so that their edges may be spaced when said arms are relatively oriented to be at their closest spacing, and arranged so that said edges overlap when said arms are spread by extension of the piston and to perform a shearing action on an object between them in moving from said spread toward said overlapping relationship.

5. Access or rescue tool as claimed in claim 1 wherein said cylinder is pivotally mounted on one of said arms adjacent the end of the cylinder from which the piston rod projects, and the piston rod is pivotally connected to the other arm at a location such that the body of said piston cylinder projects transversely from the arm to which it is attached in a direction away from the other arm.

6. Access or rescue tool as claimed in claim 5 wherein said pumping means for such cylinder is manual and mounted on the end thereof remote from said one arm.

7. Access or rescue tool as claimed in claim 5 wherein said cylinder includes a hydraulic fluid reservoir connected to the low pressure side of the hydraulic circuit for operating said cylinder located on the outside of said cylinder wall, said reservoir being partially defined by a flexible wall on the outside of said cylindrical wall, said flexible wall being subject to outward pressures by the hydraulic fluid and inward atmospheric pressure.

8. Access or rescue tool as claimed in claim 1 wherein said cylinder includes a hydraulic fluid reservoir connected to the low pressure side of the hydraulic circuit for operating said cylinder on the outside of said cylinder on the outside of said cylinder wall, said reservoir being partially defined by a flexible wall located on the outide of said cylindrical wall, said flexible wall being subject to outward pressures by the hydraulic fluid and inward atmospheric pressure.

9. Access or rescue tool as claimed in claim 1 including a pair of shears, each connected to pivot one of said arm pivot axis, each said shear being mounted to project from said pivot point in the opposite direction from said free arm ends, said two shears being arranged so that their edges may be spaced when said arms are relatively oriented to be at their closest spacing, and arranged so that said edges overlap when said arms are spread by extension of the piston and to perform a shearing action on an object between them in moving from said spread toward said overlapping relationship.

10. Access or rescue tool comprising:

a pair of arms pivotally connected together adjacent one end of each such arm, whereby each arm has a free end remote from its pivotally connected end, a hydraulic piston cylinder with a piston contained therein and a piston rod attached to said piston and projecting from one end of said cylinder, said piston cylinder being pivotally attached to one of said arms intermediate its connected and its free end, and said piston rod being pivotally attached to the other of said arms intermediate its connected and its free end, said piston cylinder and rod pivotal connections being approximately equidistant from said pivot point, said cylinder and piston rod pivotal connections being substantially parallel to the arm pivotal connection, pump means mounted on said cylinder for providing hydraulic fluid to said piston cylinder to cause extension of said piston rod, means allowing retraction of said piston rod, a tool member mounted on the free end of at least one of said arms.

11. Access or rescue tool as claimed in claim 10 wherein said cylinder is pivotally mounted on one of said arm adjacent end of the cylinder from which the piston rod projects, and the piston rod is pivotally connected to the other arm at a location such that the body of said piston cylinder projects from the arm to which it is attached in a direction away from the other arm.

12. Access or rescue tool as claimed in claim 11 wherein said pumping means for such cylinder is manual and mounted on the end thereof remote from said one arm.

13. Access or rescue tool as claimed in claim 10 wherein said cylinder includes a hydraulic fluid reservoir connected to the low pressure side of the hydraulic circuit for operating said cylinder located on the outside of said cylinder wall, said reservoir being partially defined by a flexible wall on the outside of said cylindrical wall, said flexible wall being subject to outward pressures by the hydraulic fluid and inward atmospheric pressure.

* * * * *